(12) United States Patent
Lee et al.

(10) Patent No.: US 11,729,452 B2
(45) Date of Patent: Aug. 15, 2023

(54) MEDIA CONTENT PLAYBACK DEVICE FOR A VEHICLE AND A METHOD THEREFOR

(71) Applicants: HYUNDAI MOTOR COMPANY, Seoul (KR); KIA CORPORATION, Seoul (KR)

(72) Inventors: Hyun Woo Lee, Seoul (KR); Seo Hwan Choi, Seoul (KR); Seong Soo Yae, Hwaseong-si (KR); Kyowoong Choo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/517,442

(22) Filed: Nov. 2, 2021

(65) Prior Publication Data

US 2022/0201352 A1 Jun. 23, 2022

(30) Foreign Application Priority Data

Dec. 21, 2020 (KR) .................. 10-2020-0180239

(51) Int. Cl.
*H04N 21/414* (2011.01)
*H04N 21/258* (2011.01)
*H04N 21/472* (2011.01)

(52) U.S. Cl.
CPC .. *H04N 21/41422* (2013.01); *H04N 21/25825* (2013.01); *H04N 21/47217* (2013.01)

(58) Field of Classification Search
None
See application file for complete search history.

(56) References Cited

U.S. PATENT DOCUMENTS

2013/0278827 A1* 10/2013 Helm ................ G06F 16/48
348/563

FOREIGN PATENT DOCUMENTS

BR      102013009269 A2 *  6/2015  ........... G06F 16/48
CN         103093789 A  *  5/2013  ........... H04H 60/74

* cited by examiner

*Primary Examiner* — Omar S Parra
(74) *Attorney, Agent, or Firm* — Lempia Summerfield Katz LLC

(57) ABSTRACT

A media content playback device for a vehicle and a method therefor are provided. The media content playback device includes: a media information identifying device that requests a user terminal to transmit media information and identifies the media information, when there is a request to play media content, when communicatively connected with the user terminal; a cover art obtaining device that obtains a cover art image based on the media information; and a controller that displays the cover art image on a playback screen of the media content, when playing the media content.

18 Claims, 10 Drawing Sheets

MEDIA CONTENT PLAYBACK DEVICE FOR A VEHICLE AND A METHOD THEREFOR

CROSS-REFERENCE TO RELATED APPLICATION

This application claims the benefit of priority to Korean Patent Application No. 10-2020-0180239, filed in the Korean Intellectual Property Office on Dec. 21, 2020, the entire contents of which are incorporated herein by reference.

TECHNICAL FIELD

The present disclosure relates to a media content playback device for a vehicle and a method therefor.

BACKGROUND

In general, an infotainment system for a vehicle is a system into which information referring to information necessary for driving, such as route guidance, and entertainment referring to entertainment and human-friendly functions are integrated.

The infotainment system for a vehicle is implemented in the form of a multimedia player having complex functions, such as playback of music or video files, games, and broadcast reception, as functions are diversified.

When playing media content by means of Bluetooth audio, an existing infotainment system displays a playback screen of the media content on its display screen.

In this case, a media player of a user terminal provides a cover art matching the content when playing media content. However, the infotainment system does not provide a cover art supported by the user terminal on a playback screen of the vehicle, when connecting to the user terminal and playing media content. Alternatively, the infotainment system receives a cover art image through only some user terminals and displays the cover art image on the playback screen.

SUMMARY

The present disclosure has been made to solve the above-mentioned problems occurring in the prior art while advantages achieved by the prior art are maintained intact.

An aspect of the present disclosure provides a media content playback device for a vehicle. The device provides an embedded image of a mobile phone together with a cover art of media content through direct communication with the mobile phone, direct communication with a content provider through separate mobile communication network, or the like, when playing the media content. Another aspect of the present disclosure provides a method therefor.

Another aspect of the present disclosure provides a media content playback device for a vehicle for using an image stored in a database (DB) as a cover art image to display the cover art image on the playback screen, when it is difficult to obtain the cover art image. Another aspect of the present disclosure also provides a method therefor.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a media content playback device for a vehicle may include a media information identifying device that requests a user terminal to transmit media information and that identifies the media information, when there is a request to play media content, when communicatively connected with the user terminal. The device may also include a cover art obtaining device that obtains a cover art image based on the media information. The device may also include a controller that displays the cover art image on a playback screen of the media content playback device, when playing the media content.

The media content playback device may further include an environment setup device that sets up a terminal environment of the user terminal, when communicatively connected with the user terminal.

The environment setup device may set up a media playback environment for playing media content of the user terminal and may set up a cover art acquisition target of the media content.

The environment setup device may determine whether it is possible to obtain a cover art image from a media player of the user terminal.

The environment setup device may set the user terminal to the cover art acquisition target, when it is possible to obtain the cover art image from the media player of the user terminal. The environment setup device may set a content provider connectable over a wireless network to the cover art acquisition target, when it is impossible to obtain the cover art image from the media player of the user terminal.

The cover art obtaining device may transmit a protocol message to the user terminal to obtain the cover art image, when the cover art acquisition target for the media content is set as the user terminal.

The cover art obtaining device may transmit media information to the content provider to request the cover art image, when the cover art acquisition target for the media content is set as the content provider.

The cover art obtaining device may update a cover art acquisition history from the content provider in a DB, when the cover art image is received from the content provider.

The cover art obtaining device may request the user terminal and the content provider to transmit a cover art image for the media content and may obtain the first received cover art image.

The cover art obtaining device may obtain the cover art image based on a cover art acquisition history for the media content, when there is the cover art acquisition history for the media content on a DB.

The controller may replace any one of images stored in a DB with a cover art image and may display the cover art image on the playback screen of the media content when playing the media content, when not obtaining a cover art image for the media content.

The media information may include at least one of a title, an artist, or album information of the media content.

According to another aspect of the present disclosure, a media content playback method for a vehicle may include: requesting a user terminal to transmit media information and identifying the media information, when there is a request to play media content, when the user terminal is communicatively connected; obtaining a cover art image based on the media information; and displaying the cover art image on a playback screen of the media content, when playing the media content.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
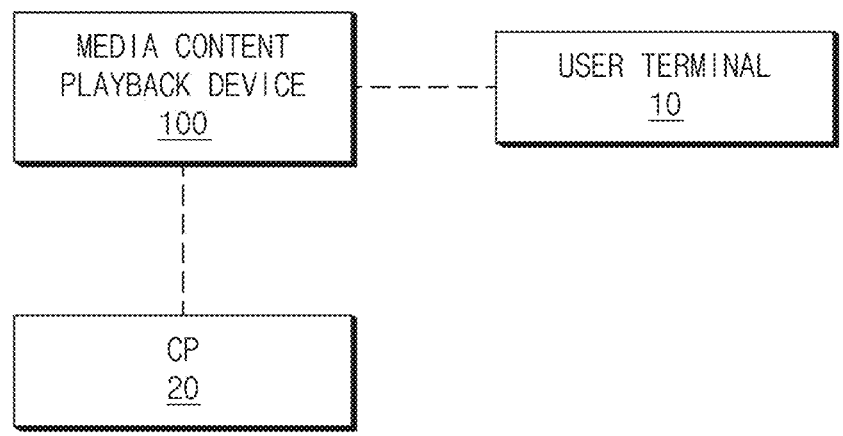
FIG. 1 is a block diagram illustrating a vehicle system to which a media content playback device for vehicle is applied according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram illustrating a vehicle system to which a media content playback device for vehicle is applied according to an embodiment of the present disclosure.

Referring to FIG. 1, the vehicle system may include a media content playback device 100 for vehicle and may further include a user terminal 10 and a content provider (CP) 20.

When communicatively connected with the user terminal 10, the media content playback device 100 for vehicle may play media content requested by the user terminal 10.

Herein, the user terminal 10 may correspond to an electronic device, which has a signal transmission and reception function with the media content playback device 100 for vehicle of a vehicle while it is possible to play media content. As an example, the electronic device may include a smartphone, a tablet personal computer (PC), a smart watch, or the like. Herein, this is merely one embodiment, but not limited thereto.

When communicatively connected with the user terminal 10, the media content playback device 100 for vehicle may set up an environment to be matched with a communication environment of the user terminal 10.

Furthermore, when there is a request to play media content from the user terminal 10, the media content playback device 100 for vehicle may identify media information of the content, may obtain a cover art image corresponding to the identified media information, and may display the obtained cover art image together on a display screen when playing the media content.

At this time, the media content playback device 100 for vehicle may obtain the cover art image from the user terminal 10 or the CP 20 depending on a terminal and/or communication environment.

Herein, the CP 20 refers to a means, which stores a cover art image corresponding to media content and provides the cover art image when there is a request for the cover art image from the media content playback device 100 of the vehicle. As an example, the CP 20 may be a content providing server connected over a mobile communication network.

The media content playback device 100 for a vehicle according to an embodiment of the present disclosure may be implemented in the vehicle. In this case, the media content playback device 100 for vehicle may be integrally configured with control units in the vehicle or may be implemented as a separate device to be connected with the control units of the vehicle by a separate connection means.

As an example, the media content playback device 100 for vehicle may be implemented in the form of an infotainment system of the vehicle.

Thus, a detailed configuration of the media content playback device 100 for a vehicle is described with reference to an embodiment of FIG. 2.

Figure 2:
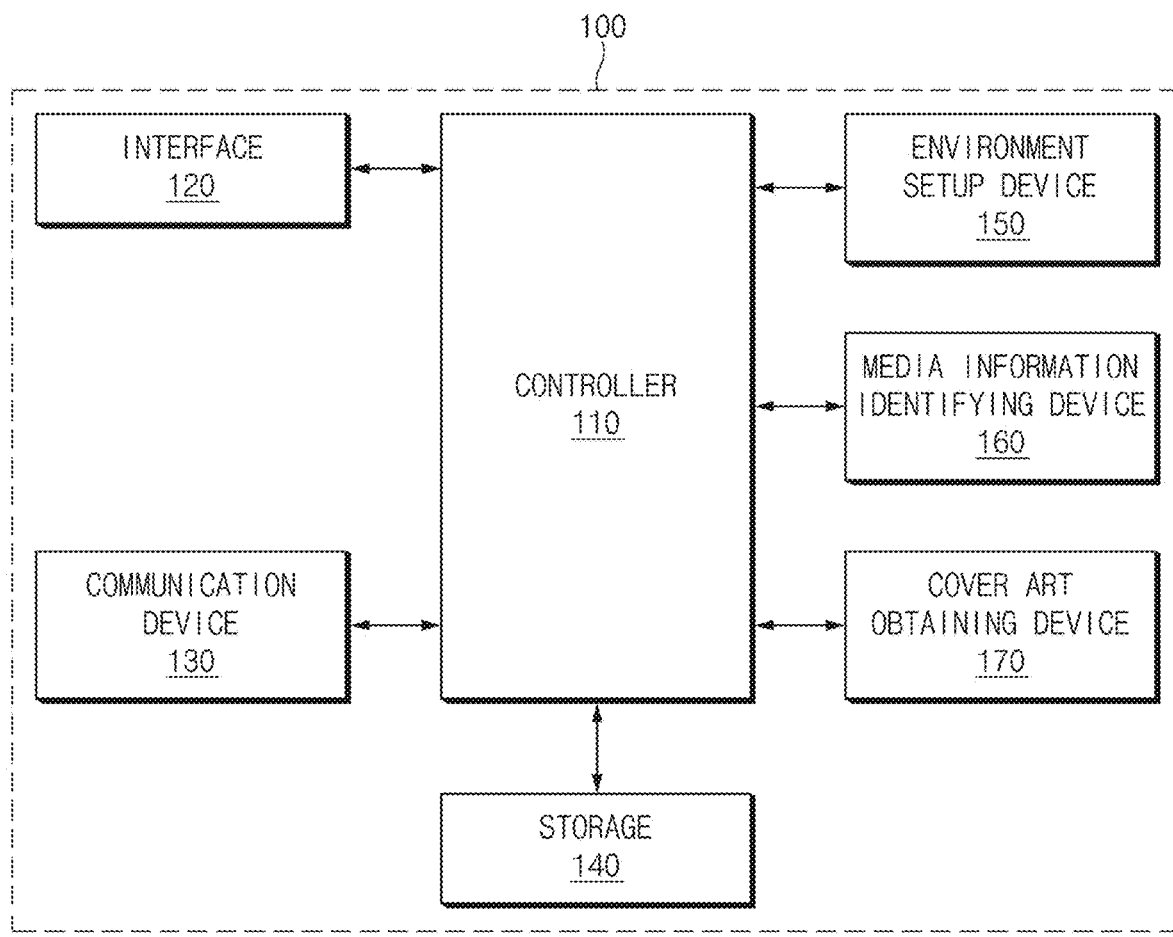
FIG. 2 is a block diagram illustrating a configuration of a media content playback device for vehicle according to an embodiment of the present disclosure.

FIG. 2 is a block diagram illustrating a configuration of a media content playback device for a vehicle according to an embodiment of the present disclosure.

Referring to FIG. 2, a media content playback device 100 for a vehicle may include a controller 110, an interface 120, a communication device 130, a storage 140, an environment setup device 150, a media information identifying device 160, and a cover art obtaining device 170. Herein, the controller 110, the environment setup device 150, the media information identifying device 160, and the cover art obtaining device 170 of the media content playback device 100 for a vehicle may be implemented as at least one processor.

The controller 110 may control operations of the respective components of the media content playback device 100 for vehicle. Furthermore, the controller 110 may process a signal delivered between the respective components.

The interface 120 may include an input means for receiving a control command from a user and an output means for outputting an operation state, an operation result, or the like of the media content playback device 100 for vehicle.

Herein, the input means may include a key button and may include a mouse, a joystick, a jog shuttle, a stylus pen, or the like. Furthermore, the input means may include a soft key implemented on a display.

An output means may include a display and may include a voice output means such as a speaker.

In this case, when a touch sensor such as a touch film, a touch sheet, or a touch pad is provided in the display, the display may operate as a touchscreen and may be implemented in a form where the input means and the output means are integrated with each other.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The communication device 130 may include a communication module for vehicle network communication with electronics and/or controllers provided in the vehicle.

Herein, the communication module may include a module supporting vehicle network communication such as controller area network (CAN) communication, local interconnect network (LIN) communication, or flex-ray communication.

Furthermore, the communication device 130 may include a communication module for short range communication or a communication module for accessing wireless Internet.

Furthermore, a technology for the short range communication may include Bluetooth, ZigBee, ultra wideband (UWB), radio frequency identification (RFID), infrared data association (IrDA), or the like.

As an example, the communication module may transmit and receive a signal with a user terminal 10 of FIG. 1 in the vehicle in a short range communication scheme. At this time, the communication module may receive environmental information for media playback from the user terminal 10. Furthermore, the communication module may receive media information and a cover art image of corresponding media from the user terminal 10.

Furthermore, a technology for the wireless Internet may include wireless local area network (WLAN), wireless broadband (WiBro), wireless-fidelity (Wi-Fi), world interoperability for microwave access (WiMAX), or the like.

As an example, the communication module may transmit and receive a signal with a CP 20 of FIG. 1 over a wireless Internet. At this time, the communication module may receive a cover art image of media.

The storage 140 may store data, an algorithm, and/or the like necessary for an operation of the media content playback device 100 for vehicle.

As an example, the storage 140 may store an algorithm for setting up a communication environment with the user terminal 10 and/or the CP 20. Furthermore, the storage 140 may store a command and/or an algorithm for playing media depending on the request of the user terminal 10 and displaying a cover art image of media to be played.

Furthermore, the storage 140 may include a database (DB) which stores an embedded image and/or a cover art image.

Herein, the storage 140 may include a storage medium such as a random access memory (RAM), a static RAM (SRAM), a read-only memory (ROM), a programmable ROM (PROM), or an electrically erasable PROM (EEPROM).

The controller 110 may download update data of a vehicle controller or may process a signal delivered between the respective components of the media content playback device 100 for vehicle during an update.

When there is a request to play media content from the user terminal 10 connected through the communication module, the controller 110 may execute a media player for playing media content in a vehicle system and may play the requested media content. Herein, the media player may be implemented in the form of a media player app.

Before playing media content, the controller 110 may control the environment setup device 150, the media information identifying device 160, and/or the cover art obtaining device 170 to implement a media content playback environment.

Thus, the environment setup device 150 may set up a communication environment for transmitting and receiving a signal with the user terminal 10 through the communication module.

Furthermore, the environment setup device 150 may set up a media playback environment for playing media content requested from the user terminal 10. As an example, the environment setup device 150 may select a media player capable of processing a media control command from the user terminal 10 and may set up an environment. Herein, the media control command may include "play", "pause", "next", "previous", or the like.

When the media content playback device 100 for vehicle is communicatively connected with the user terminal 10 and when media content is being played by means of the media player of the user terminal 10, the environment setup device 150 may identify information of the media player, which is playing the media content in the user terminal 10. At this time, the environment setup device 150 may select a player to play media content in the vehicle system based on the identified information of the media player.

Furthermore, the environment setup device 150 may set up an environment for receiving a cover art image from the user terminal 10. At this time, when it is possible to obtain a cover art image by means of the media player, the environment setup device 150 may set an acquisition target of the cover art image to the user terminal 10. When it is impossible to obtain the cover art image, the environment setup device 150 may set the acquisition target of the cover art image to the CP 20.

Meanwhile, the environment setup device 150 may set up a communication environment for transmitting and receiving a signal with the CP 20 through the communication module. As an example, the environment setup device 150 may set up a wireless network environment for transmitting media information to the CP 20 and receiving a cover art image corresponding to media information from the CP 20.

Herein, the environment setup device 150 may run a service application (app), which manages network access of the vehicle and may set up a wireless network environment with the CP 20 by means of the service app.

When there is a request to play media content from the user terminal 10, the media information identifying device 160 may request the user terminal 10 to transmit media information. At this time, when there is a request to play new media content from the user terminal 10 or when there is a request to play another media content while playing the media content, the media information identifying device 160 may request the user terminal 10 to transmit media information.

As an example, the media information may include a title, an artist, album information, or the like of media content.

When the media information is received from the user terminal 10, the media information identifying device 160 may identify the received media information. At this time, the media information identifying device 160 may deliver the identified media information to the controller 110 and/or the cover art obtaining device 170.

When the information of media content to be played is identified by the media information identifying device 160, the cover art obtaining device 170 may determine whether a cover art image of the media content is possessed in a DB. At this time, the cover art obtaining device 170 may query for cover art acquisition history information stored in the DB to determine whether a cover art acquisition history for the media content is present.

When the cover art image of the media content is possessed in the DB, the cover art obtaining device 170 may fetch a cover art image from the DB and may deliver the cover art image to the controller 110. At this time, the cover art obtaining device 170 may deliver only information about a storage path of the cover art image to the controller 110.

Thus, when the information of media content to be played is identified by the media information identifying device 160, the controller 110 may execute the media player to play the media content.

At this time, the controller 110 may display the cover art image delivered by the cover art obtaining device 170 together on a playback screen of the media player.

When the cover art image of the media content is not possessed in the DB, the cover art obtaining device 170 may request the user terminal 10 or the CP 20 to transmit the cover art image.

At this time, the cover art obtaining device 170 may request the user terminal 10 or the CP 20 to transmit the cover art image, with reference to the cover art image acquisition target set up by the environment setup device 150.

When the cover art image acquisition target is set as the user terminal 10, the cover art obtaining device 170 may request the user terminal 10 to transmit a cover art image of target media content.

At this time, the cover art obtaining device 170 may generate a protocol message for receiving the cover art image and may transmit the protocol message to the user terminal 10. Herein, the protocol message may include encoding, a size, and/or feature information of the cover art image.

When the cover art image is received from the user terminal 10, the cover art obtaining device 170 may store the received cover art image in the DB and may deliver related information to the controller 110. At this time, the cover art obtaining device 170 may store a cover art acquisition history from the user terminal 10 together in the DB.

Thus, while playing media content to be targeted, the controller 110 may fetch the cover art image obtained from the user terminal 10 and may display the cover art image on a playback screen of the media content.

Meanwhile, when the cover art image is not received although a certain time elapses after requesting the user terminal 10 to transmit the cover art image or when a message in which it is impossible to provide the cover art image is received from the user terminal 10, the cover art obtaining device 170 may determine that it is impossible to obtain the cover art image from the user terminal 10.

Furthermore, when the media player of the user terminal 10 does not support cover art image transmission or when the cover art image acquisition target is set as the CP 20 by the environment setup device 150, the cover art obtaining device 170 may determine that it is impossible to obtain the cover art image from the user terminal 10.

When it is determined that it is impossible to obtain the cover art image from the user terminal 10, the cover art obtaining device 170 may transmit media information to the CP 20 to request the cover art image.

When the cover art image is received from the CP 20, the cover art obtaining device 170 may store the received cover art image in the DB and may deliver related information to the controller 110. At this time, the cover art obtaining device 170 may store a cover art acquisition history from the CP 20 together in the DB.

Herein, the cover art obtaining device 170 may transmit media information to be played to the CP 20 by means of a service app which manages network access of the vehicle and may receive a cover art image from the CP 20 by means of the service app.

When receiving the cover art image from the CP 20, the cover art obtaining device 170 may store cover art acquisition history information of the media content together in the DB.

When the cover art image information is received from the cover art obtaining device 170, the controller 110 may fetch the cover art image and may display the cover art image on a playback screen of the media content, while playing the media content.

Meanwhile, when it is possible to obtain a cover art image of media content from both the user terminal 10 and the CP 20, the cover art obtaining device 170 may request the user terminal 10 and the CP 20 to transmit the cover art image and may display the cover art image first received between the user terminal 10 and the CP 20 on a playback screen of the media content.

Meanwhile, when not obtaining the cover art image from the user terminal 10 or the CP 20, the cover art obtaining device 170 may deliver related information to the controller 110.

In this case, the controller 110 may execute the media player to play media content and may extract an image associated with the target media content among images stored in the DB to display the extracted image on the playback screen.

As an example, the controller 110 may extract a picture corresponding to a singer of media content to be played and may display the extracted picture on a playback screen of the media player. Furthermore, the controller 110 may extract a background picture associated with a title of the media content to be played and may display the extracted background picture on the playback screen of the media player.

Meanwhile, the controller 110 may select any image among the images stored in the DB and may display the selected image on the playback screen of the media player.

An embodiment of an operation of displaying the cover art image on the playback screen, when playing the media content, is described with reference to FIGS. 3A, 3B, and 3C.

Figure 3A:
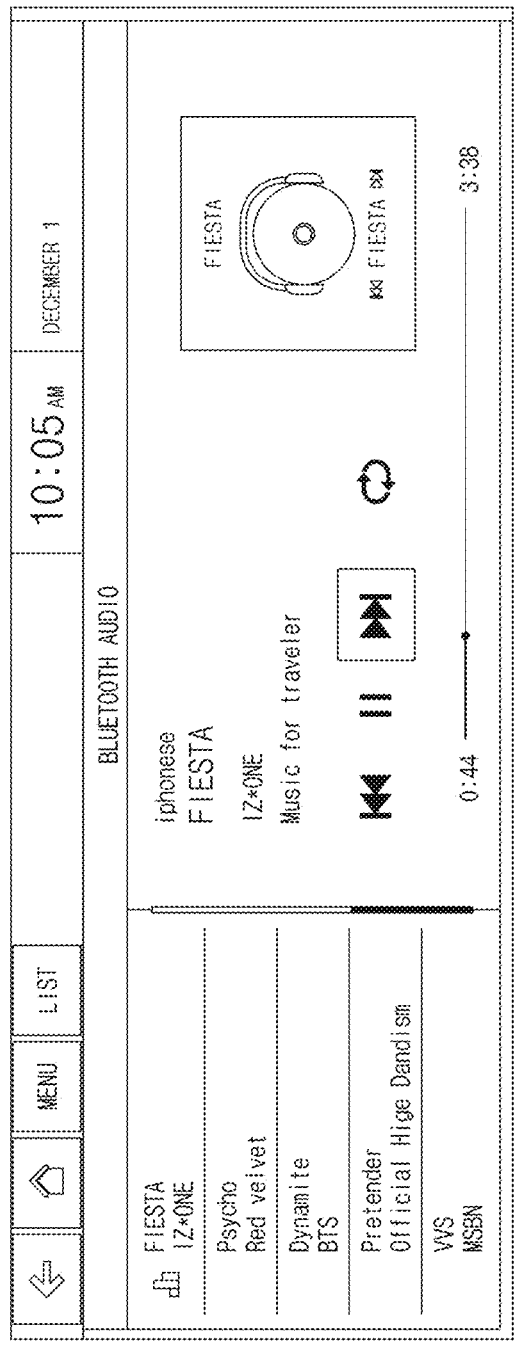
FIGS. 3A, 3B, and 3C are drawings illustrating a media content playback screen of a media content playback device for vehicle according to an embodiment of the present disclosure.

First of all, FIG. 3A illustrates an embodiment of displaying a cover art image obtained from a user terminal 10 communicatively connected on the playback screen.

Referring to FIG. 3A, a cover art obtaining device 170 of a media content playback device 100 for a vehicle may be communicatively connected with the user terminal 10. When a media content playback request is received, the cover art obtaining device 170 may identify a path capable of obtaining a cover art image.

At this time, when it is able to obtain a cover art image through direct communication with the user terminal 10, the cover art obtaining device 170 may receive the cover art image from the user terminal 10 and may display the obtained cover art image on a playback screen of media content.

Herein, when the media content playback device 100 for a vehicle has a plurality of communication schemes supporting the reception of a cover art image from the user terminal 10, it may obtain a cover art image using any one communication scheme.

As an example, when it is possible for the user terminal 10 to transmit a cover art image through Bluetooth communication and its own wireless protocol (iAP) communication, the media content playback device 100 for vehicle may select a communication scheme with a high priority and may receive a cover art image.

Meanwhile, when the media content playback device 100 for a vehicle has the plurality of communication schemes supporting the reception of a cover art image from the user terminal 10, it may select a communication scheme with the fastest communication speed to obtain a cover art image.

As such, when the cover art image for the media content is received from the user terminal 10, the media content playback device 100 for vehicle may display the cover art image received from the user terminal 10 together on the playback screen, when playing the media content.

When it is able to obtain a cover art image through direct communication with the user terminal 10 and obtain the cover art image through communication with the CP 20, the media content playback device 100 for a vehicle may request the user terminal 10 and the CP 20 to transmit the cover art image and may display the first received cover art image on the playback screen of the media content.

Figure 3B:
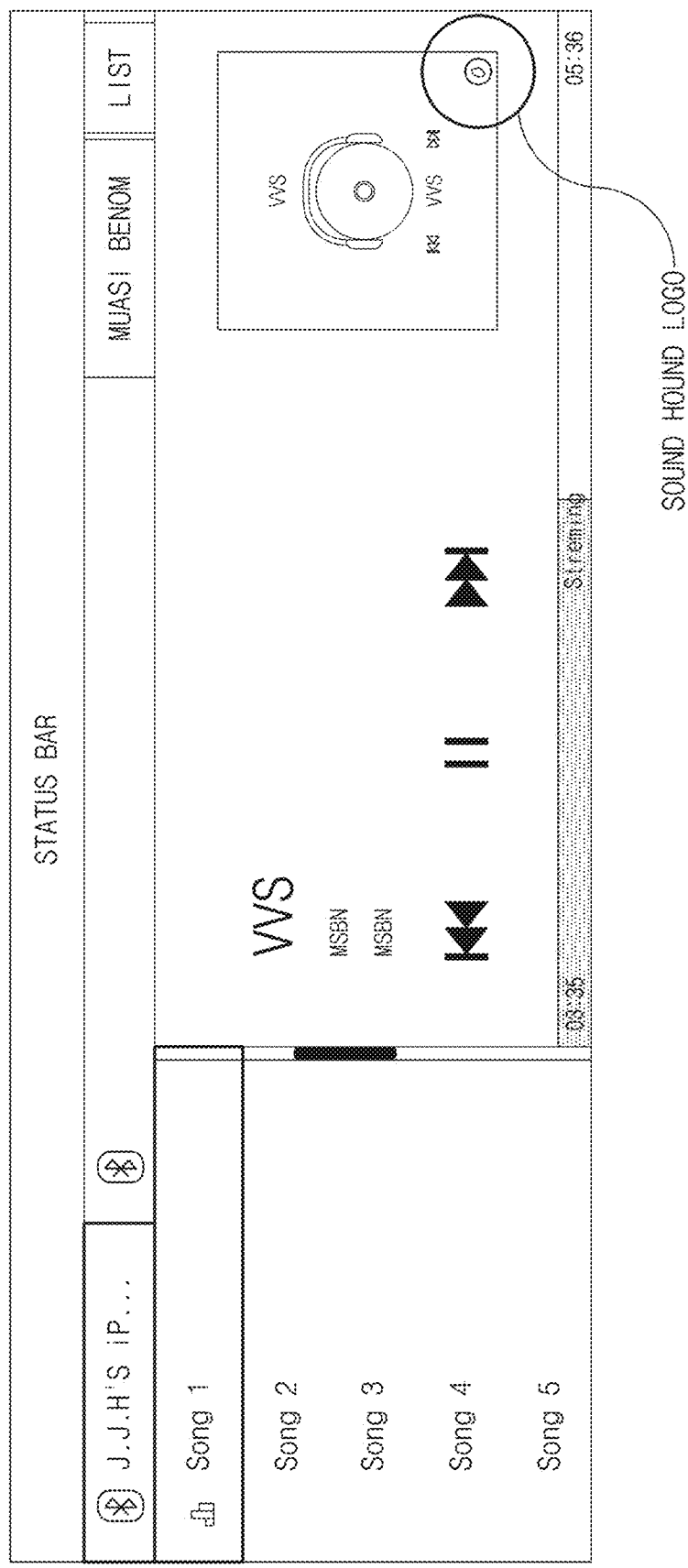

FIG. 3B illustrates an embodiment of displaying a cover art image obtained from a CP on the playback screen.

Referring to FIG. 3B, a cover art obtaining device 170 of a media content playback device 100 for a vehicle may be communicatively connected with a user terminal 10 of FIG. 1. When a media content playback request is received, the cover art obtaining device 170 may identify a path capable of obtaining a cover art image.

At this time, when the user terminal 10 or a media player of the user terminal 10 does not support transmission of a cover art image, the cover art obtaining device 170 may determine that it is impossible to obtain the cover art image from the user terminal 10.

In this case, the cover art obtaining device 170 may obtain a cover art image through only a CP 20 of FIG. 1.

Thus, the cover art obtaining device 170 may transmit media information to be played to the CP 20 to request a cover art image and may obtain the cover art image from the CP 20.

When the cover art image is received from the CP 20, the media content playback device 100 for a vehicle may display the cover art image received from the CP 20 on a playback screen of media content.

At this time, the media content playback device 100 for vehicle may display information of the CP 20 together with the cover art image displayed on the playback screen.

Figure 3C:
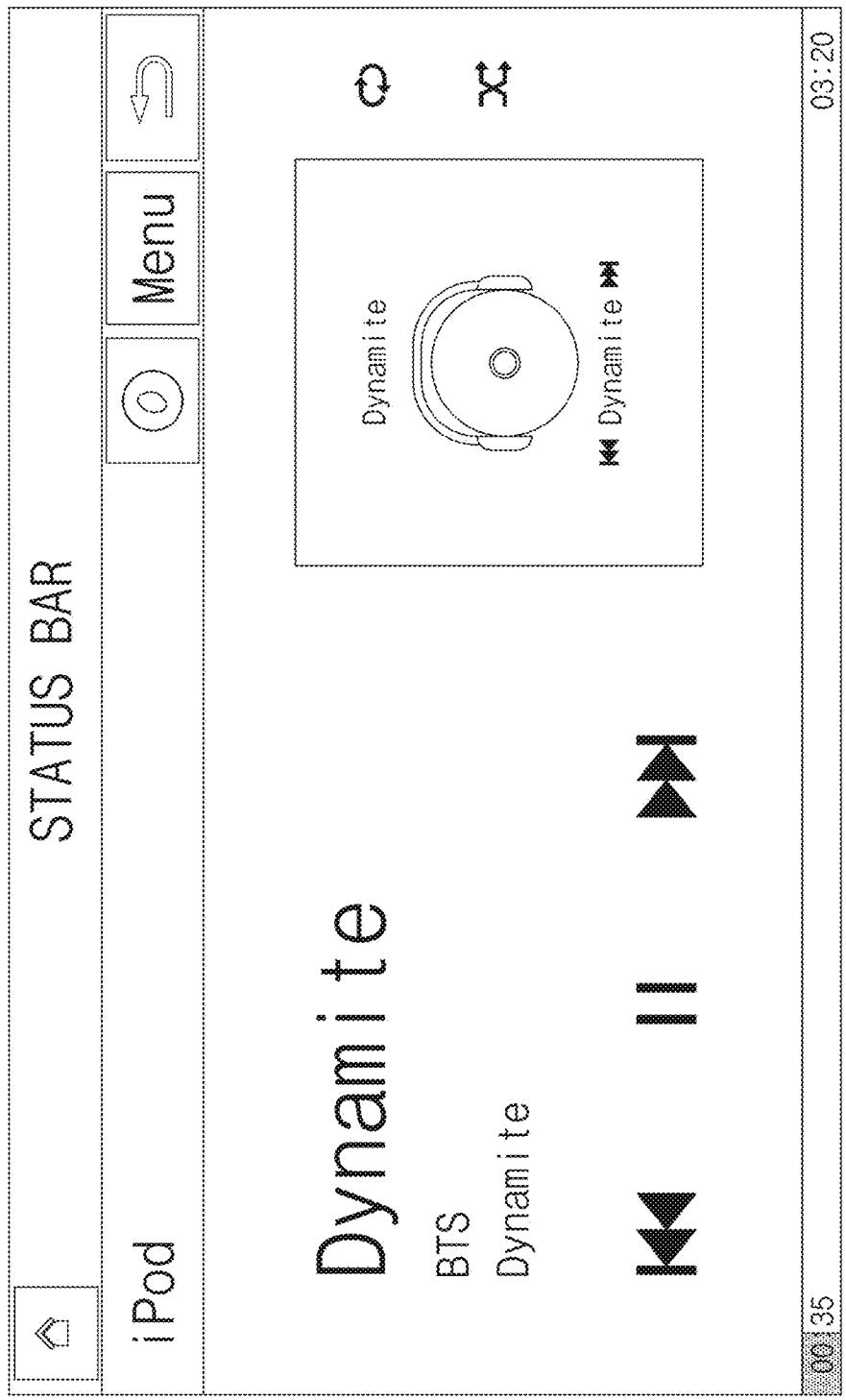

FIG. 3C illustrates an embodiment of displaying an internally possessed image on the playback screen.

Referring to FIG. 3C, a cover art obtaining device 170 of a media content playback device 100 for a vehicle may be communicatively connected with a user terminal 10 of FIG. 1. When a media content playback request is received, the cover art obtaining device 170 may identify a path capable of obtaining a cover art image.

At this time, when the user terminal 10 or a media player of the user terminal 10 does not support transmission of a cover art image, the cover art obtaining device 170 may determine that it is impossible to obtain the cover art image from the user terminal 10.

In this case, the cover art obtaining device 170 may obtain a cover art image through only a CP 20 of FIG. 1. Herein, when there is no CP 20 that provides a cover art image of corresponding media content, as shown in FIG. 3C, the media content playback device 100 for a vehicle may select any one of images internally possessed in a DB and may display the selected image on a playback screen of media content.

As such, when playing media content, the media content playback device 100 for a vehicle may display a cover art image obtained from the user terminal 10 communicatively connected on the playback screen or may obtain and display a cover art image from the CP 20 on the playback screen. When it is difficult to obtain a cover art image, the media content playback device 100 for a vehicle may display an internally possessed image together on the playback screen of the media content.

The media content playback device 100 for vehicle according to an embodiment of the present disclosure, which performs the above-mentioned operations, may be implemented in the form of an independent hardware device including a memory and a processor for processing each operation or may be driven in the form of being included in another hardware device such as a microprocessor or a universal computer system.

A description is given in detail of the operational flow of the media content playback device for a vehicle according to an embodiment of the present disclosure, which has the above-mentioned configuration.

Figure 4:
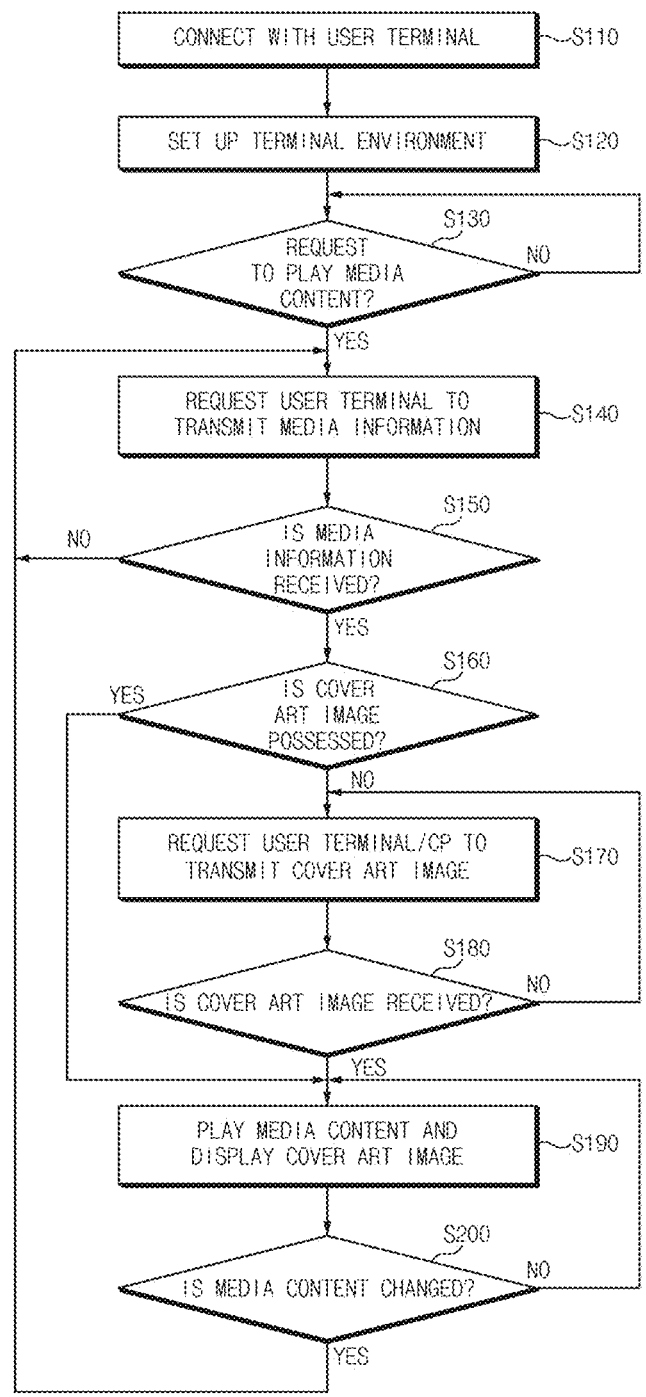
FIG. 4 is a drawing illustrating operational flow of a media content playback method for vehicle according to an embodiment of the present disclosure.

FIG. 4 is a drawing illustrating the operational flow of a media content playback method for a vehicle according to an embodiment of the present disclosure.

Referring to FIG. 4, when connected with a user terminal 10 of FIG. 1 in S110, in S120, a media content playback device 100 for a vehicle may set up a terminal environment of the user terminal 10. Herein, the media content playback device 100 for a vehicle may set up a communication environment with the user terminal 10 and may set up an environment for playing media content. Furthermore, the media content playback device 100 for a vehicle may set up an environment for obtaining a cover art image together.

Thereafter, when there is a request to play media content in S130, in S140, the media content playback device 100 for a vehicle may request the user terminal 10 to transmit media information to be played. Herein, the media content playback device 100 for vehicle may request a title, an artist, album information, or the like of media content to be played.

When the media information to be played is received from the user terminal 10 in S150, in S160, the media content playback device 100 for a vehicle may determine whether a cover art image for the media content is possessed in a DB.

When the cover art image of the media content is possessed in the DB, in S190, the media content playback device 100 for a vehicle may simultaneously display the cover art image stored in the DB on a playback screen of the media content, while playing the media content.

Meanwhile, when it is determined that the cover art image of the media content is not possessed in S160, in S170, the media content playback device 100 for vehicle may request the user terminal 10 and/or a CP 20 of FIG. 1 to transmit a cover art image depending on the communication environment or the media playback environment. In S170, the media content playback device 100 for a vehicle may request the cover art image of the media content while transmitting the media information to the user terminal 10 and/or the CP 20.

At this time, when the cover art image is received from the user terminal 10 or the CP 20 in S180, in S190, the media content playback device 100 for a vehicle may simultaneously display the cover art image received in S180 on the playback screen, while playing the media content.

The media content playback device 100 for a vehicle may repeatedly perform S140 to S190, whenever media content to be played is changed in S200.

Although not illustrated in FIG. 4, when it is difficult to obtain a cover art image from the user terminal 10 or the CP 20, the media content playback device 100 for a vehicle may select any one of images internally possessed in the DB and may display the selected image on the playback screen of the media content.

Figure 5:
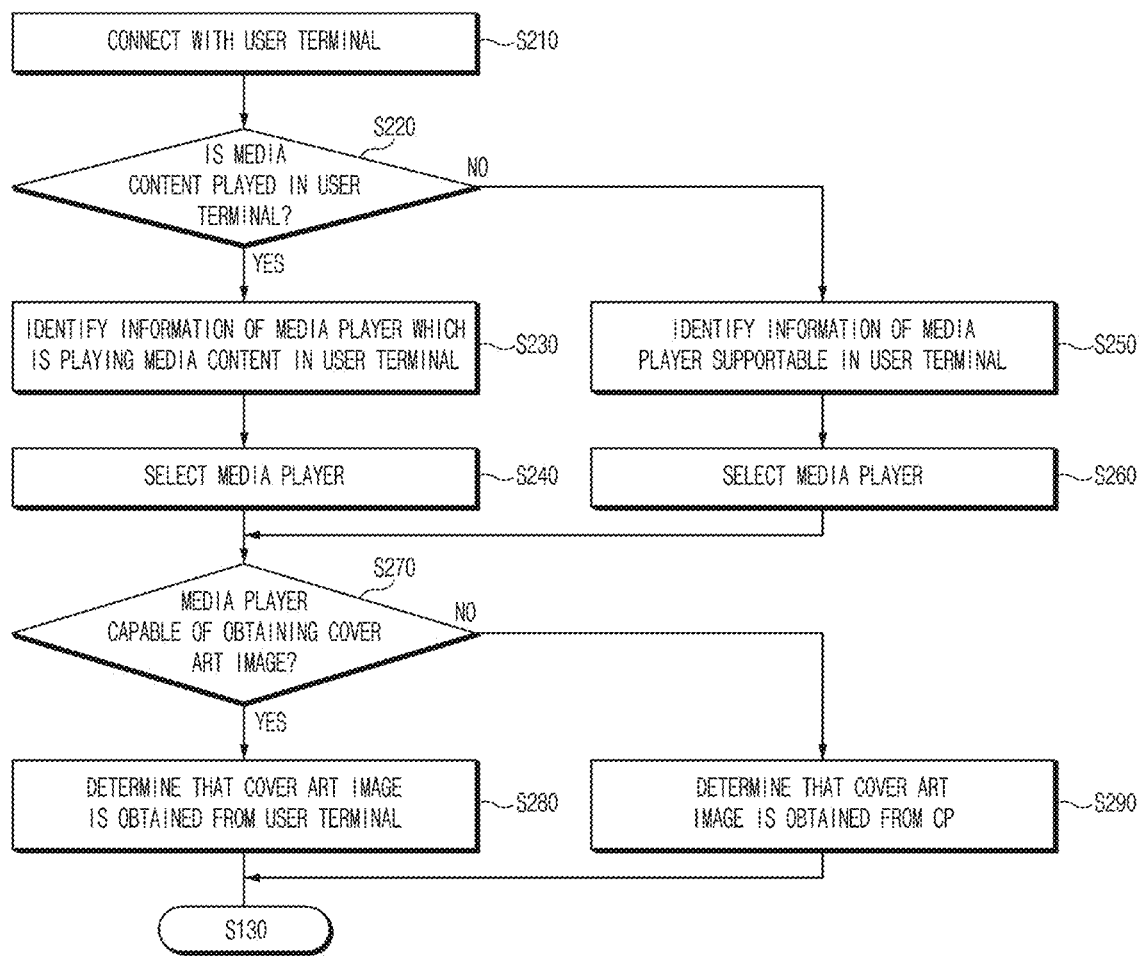
FIG. 5 is a drawing illustrating a flow of an operation of setting up an environment according to an embodiment of the present disclosure.

FIG. 5 is a drawing illustrating a flow of an operation of setting up an environment according to an embodiment of the present disclosure, and which illustrates a detailed operational flow of S120 of FIG. 4.

Referring to FIG. 5, when connected with a user terminal 10 of FIG. 1 in S210, a media content playback device 100 for a vehicle may determine whether media content is already played in the user terminal 10.

At this time, when the media content is already played in the user terminal 10 in S220, in S230, the media content playback device 100 for a vehicle may identify information of a media player, which is playing the media content from the user terminal 10.

In S240, the media content playback device 100 for a vehicle may select the media player based on the media player information identified in S230.

At this time, when the user terminal 10 does not play the media content in S220 when connected with the user terminal 10, in S250, the media content playback device 100 for a vehicle may identify information of the media player in which it is possible to supply a media playback command in the user terminal 10. In S260, the media content playback device 100 for vehicle may select the media player.

The media content playback device 100 for a vehicle may determine whether the media player selected in S240 or S260 is a media player capable of obtaining a cover art image. When the media player is the media player capable of obtaining the cover art image in S270, in S280, the media content playback device 100 may determine that the cover art image is obtained from the user terminal 10.

On the other hand, when it is determined that the media player is not the media player capable of obtaining the cover art image in S270, in S290, the media content playback device 100 for a vehicle may determine that the cover art image is obtained from a CP 20 of FIG. 1.

Thereafter, when requesting the cover art image in S170 of FIG. 4, the media content playback device 100 for a vehicle may request the target determined in S280 or S290 to transmit the cover art image.

In FIG. 5, the operation of determining any one of the user terminal 10 or the CP 20 as the cover art image acquisition target is shown. However, when it is possible to obtain the cover art image from both the user terminal 10 and the CP 20, the media content playback device 100 for a vehicle may determine both the user terminal 10 and the CP 20 as cover art image acquisition targets.

Figure 6:
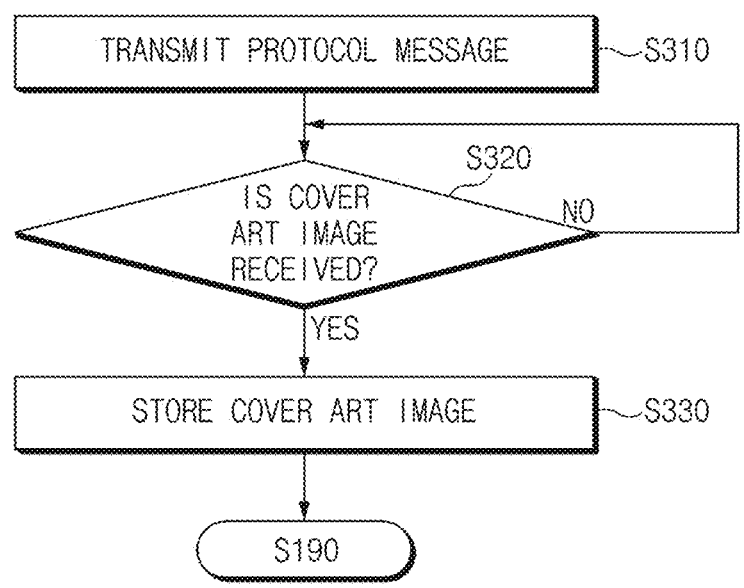
FIGS. 6 and 7 are drawings illustrating a flow of an operation of obtaining a cover art image according to an embodiment of the present disclosure.
Figure 7:
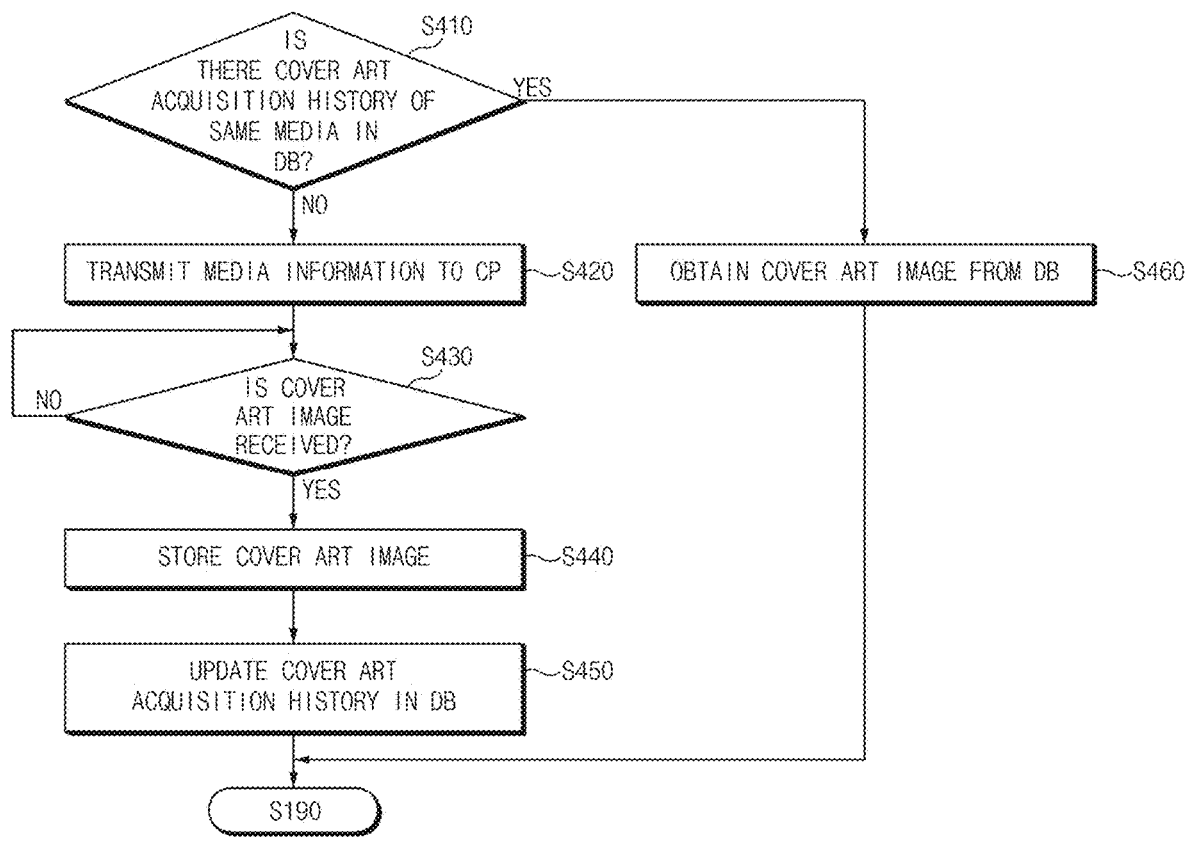

FIGS. 6 and 7 are drawings illustrating the flow of an operation of obtaining a cover art image according to an embodiment of the present disclosure.

First, FIG. 6 illustrates an operation of obtaining a cover art image from a user terminal.

Referring to FIG. 6, when requesting a user terminal 10 of FIG. 1 to transmit a cover art image, in S310, a media content playback device 100 for a vehicle may transmit a protocol message for receiving the cover art image to the user terminal 10. Herein, the protocol message may include encoding, a size, and/or feature information of the cover art image.

Thus, when the protocol message is received from the media content playback device 100 for a vehicle, the user terminal 10 may transmit the cover art image to the media content playback device 100 for a vehicle based on the received protocol message.

When the cover art image is received from the user terminal 10 in S320, in S330, the media content playback device 100 for a vehicle may store the received cover art image in a DB.

Thereafter, the media content playback device 100 for a vehicle may perform S190 of FIG. 4.

FIG. 7 illustrates an operation of obtaining a cover art image from a CP.

Referring to FIG. 7, before requesting a CP 20 of FIG. 1 to transmit a cover art image, a media content playback device 100 for a vehicle may determine whether there is a cover art acquisition history for the same media in a DB. Herein, when it is determined that there is the cover art acquisition history for the same media in the DB in S410, in S460, the media content playback device 100 for a vehicle may obtain a cover art image based on history information stored in the DB.

Meanwhile, when it is determined that there is no cover art acquisition history for the same media in the DB in S410, in S420, the media content playback device 100 for a vehicle may transmit media information to the CP 20. In S420, the media content playback device 100 for a vehicle may request a cover art image while transmitting the media information.

When the cover art image is received from the CP 20 in S430, in S440, the media content playback device 100 for a vehicle may store the cover art image received in S430. In S450, the media content playback device 100 for a vehicle may update the cover art acquisition history in the DB.

Thereafter, the media content playback device 100 for a vehicle may perform S190 of FIG. 4.

Figure 8:
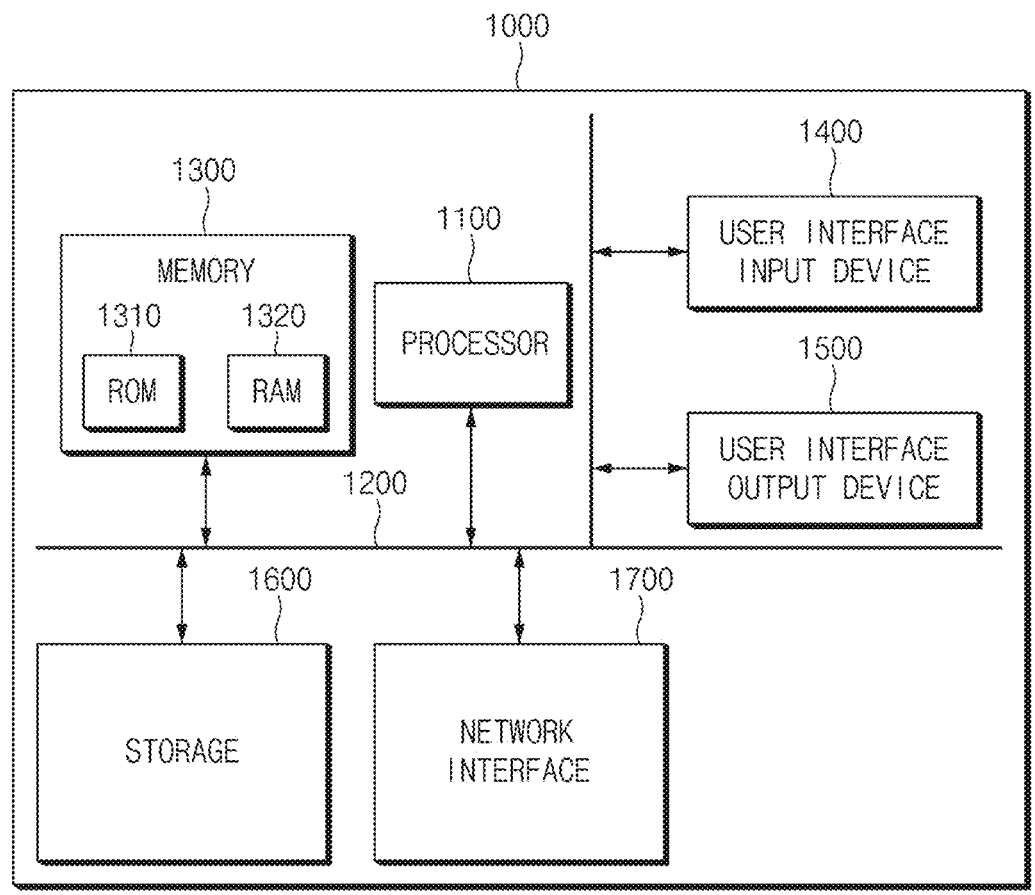
FIG. 8 is a block diagram illustrating a computing system for executing the method according to an embodiment of the present disclosure.

FIG. 8 is a block diagram illustrating a computing system for executing the method according to an embodiment of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile or non-transitory storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600)

such as a RAM, a flash memory, a ROM, an EPROM, an EEPROM, a register, a hard disk, a removable disk, and a CD-ROM. The storage medium may be coupled to the processor and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to an embodiment of the present disclosure, the media content playback device may provide an embedded image of a mobile phone together with a cover art of media content through direct communication with the mobile phone, direct communication with a content provider through separate mobile communication network, or the like, when playing the media content. The playback device may use an image stored in the DB as a cover art image to display the cover art image on the playback screen, when it is difficult to obtain the cover art image, thus continuing providing the cover art image.

Hereinabove, although the present disclosure has been described with reference to specific embodiments and the accompanying drawings, the present disclosure is not limited thereto. The embodiments and the present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:

1. A media content playback device for a vehicle, the media content playback device comprising:
   a media information identifying device configured to request a user terminal to transmit media information and identify the media information, when there is a request to play media content, when communicatively connected with the user terminal;
   a cover art obtaining device configured to
      determine whether a cover art image of the media content is possessed in a database (DB),
      when the cover art image of the media content is possessed in the DB, obtain the cover art image based on the media information from the DB, and
      when the cover art image of the media content is not possessed in the DB, obtain the cover art image from at least one of the user terminal or a content provider; and
   a controller configured to display the cover art image on a playback screen of the media content, when playing the media content,
   wherein the controller selects any one of images stored in the DB when the cover art image is not obtained from at least one of the user terminal or the content provider.

2. The media content playback device of claim 1, further comprising:
   an environment setup device configured to set up a terminal environment of the user terminal, when communicatively connected with the user terminal.

3. The media content playback device of claim 2, wherein the environment setup device sets up a media playback environment for playing media content of the user terminal and sets up a cover art acquisition target of the media content.

4. The media content playback device of claim 3, wherein the environment setup device determines whether it is possible to obtain a cover art image from a media player of the user terminal.

5. The media content playback device of claim 4, wherein the environment setup device sets the user terminal to the cover art acquisition target, when it is possible to obtain the cover art image from the media player of the user terminal, and sets the content provider connectable over a wireless network to the cover art acquisition target, when it is impossible to obtain the cover art image from the media player of the user terminal.

6. The media content playback device of claim 5, wherein the cover art obtaining device transmits media information to the content provider to request the cover art image, when the cover art acquisition target for the media content is set as the content provider.

7. The media content playback device of claim 6, wherein the cover art obtaining device updates a cover art acquisition history from the content provider in the DB, when the cover art image is received from the content provider.

8. The media content playback device of claim 5, wherein the cover art obtaining device requests the user terminal and the content provider to transmit a cover art image for the media content and obtains the first received cover art image.

9. The media content playback device of claim 5, wherein the cover art obtaining device transmits a protocol message to the user terminal to obtain the cover art image, when the cover art acquisition target for the media content is set as the user terminal.

10. The media content playback device of claim 1, wherein the cover art obtaining device obtains the cover art image based on a cover art acquisition history for the media content, when there is the cover art acquisition history for the media content on the DB.

11. The media content playback device of claim 1, wherein the media information includes at least one of a title, an artist, or album information of the media content.

12. A media content playback method for a vehicle, the media content playback method comprising:
   requesting a user terminal to transmit media information and identifying the media information, when there is a request to play media content, when the user terminal is communicatively connected;
   determining whether a cover art image of the media content is possessed in a database (DB);
   when the cover art image of the media content is possessed in the DB, obtaining the cover art image based on the media information from the DB;
   when the cover art image of the media content is not possessed in the DB, obtaining the cover art image from at least one of the user terminal or a content provider;
   displaying the cover art image on a playback screen of the media content, when playing the media content; and
   selecting any one of images stored in the DB when the cover art image is not obtained from at least one of the user terminal or the content provider.

13. The media content playback method of claim 12, further comprising:
    setting up a terminal environment of the user terminal, when the user terminal is communicatively connected.

14. The media content playback method of claim 13, wherein the setting up of the terminal environment includes:
    setting up a media playback environment for playing media content of the user terminal and setting up a cover art acquisition target of the media content.

15. The media content playback method of claim 14, wherein the setting up of the terminal environment includes:
    determining whether it is possible to obtain a cover art image from a media player of the user terminal; and
    setting the user terminal to the cover art acquisition target, when it is possible to obtain the cover art image from the media player of the user terminal, and setting the content provider connectable over a wireless network to the cover art acquisition target, when it is impossible to obtain the cover art image from the media player of the user terminal.

16. The media content playback method of claim 15, wherein the obtaining of the cover art image includes:
    transmitting a protocol message to the user terminal to obtain the cover art image, when the cover art acquisition target for the media content is set as the user terminal.

17. The media content playback method of claim 15, wherein the obtaining of the cover art image includes:
    transmitting media information to the content provider to request the cover art image, when the cover art acquisition target for the media content is set as the content provider; and
    updating a cover art acquisition history from the content provider in the DB, when the cover art image is received from the content provider.

18. The media content playback method of claim 12, wherein the obtaining of the cover art image includes:
    obtaining the cover art image based on a cover art acquisition history for the media content, when there is the cover art acquisition history for the media content on the DB.

* * * * *